(12) United States Patent
Al-Huwaider

(10) Patent No.: US 9,403,564 B1
(45) Date of Patent: Aug. 2, 2016

(54) DYNAMICALLY ADJUSTABLE AIRFOIL SYSTEM FOR ROAD VEHICLES

(71) Applicant: Mustafa Ali Hussain Al-Huwaider, Khobar (SA)

(72) Inventor: Mustafa Ali Hussain Al-Huwaider, Khobar (SA)

( * ) Notice: Subject to any disclaimer, the term of this patent is extended or adjusted under 35 U.S.C. 154(b) by 0 days.

(21) Appl. No.: 14/798,389

(22) Filed: Jul. 13, 2015

Related U.S. Application Data

(60) Provisional application No. 62/116,292, filed on Feb. 13, 2015.

(51) Int. Cl.
*B62D 35/00* (2006.01)
*B62D 37/02* (2006.01)

(52) U.S. Cl.
CPC .............. *B62D 35/007* (2013.01); *B62D 37/02* (2013.01); *B60G 2800/01* (2013.01); *B60G 2800/16* (2013.01)

(58) Field of Classification Search
CPC ...... B62D 35/007; B62D 37/02; B62D 35/02; B60G 2800/01; B60G 2800/16
USPC ........................................................ 296/180.1
See application file for complete search history.

(56) References Cited

U.S. PATENT DOCUMENTS

| | | | |
|---|---|---|---|
| 1,895,750 A | 1/1933 | Brown | |
| 2,665,137 A | 1/1954 | Kamm | |
| 3,455,594 A | 7/1969 | Hall et al. | |
| 4,810,022 A | 3/1989 | Takagi et al. | |
| 5,061,007 A * | 10/1991 | Simpson ................. | B60G 21/05 180/903 |
| 5,454,619 A | 10/1995 | Haraway | |
| 7,234,712 B2 | 6/2007 | Yamazaki et al. | |
| 8,113,470 B1 | 2/2012 | Motosko, III | |
| 8,731,781 B2 * | 5/2014 | Prentice ................. | B62D 35/02 296/180.1 |
| 2008/0303227 A1 * | 12/2008 | Chi Chun Idiot .... | A63H 17/262 280/1 |
| 2013/0221701 A1 * | 8/2013 | De Luca ................. | B62D 37/02 296/180.5 |

FOREIGN PATENT DOCUMENTS

| | | | | |
|---|---|---|---|---|
| DE | 102013217110 A1 * | 3/2015 | ............. | B62D 35/02 |
| JP | 6-270849 | 9/1994 | | |
| WO | WO 2012031615 A1 * | 3/2012 | ......... | B60G 17/0152 |

* cited by examiner

*Primary Examiner* — Pinel Romain
(74) *Attorney, Agent, or Firm* — Richard C. Litman

(57) ABSTRACT

The dynamically adjustable airfoil system for road vehicles includes a pair of airfoils having their respective inner ends pivotally mounted to a central, vertical base on the rear of a road vehicle. An airfoil lift assembly is coupled to an outer end of each airfoil and to a rear wheel suspension system to facilitate dynamic adjustable positioning of the airfoils in response to movements of the suspension system. A split flap is pivotally mounted to each airfoil. A split flap actuator assembly is mounted inside each airfoil and coupled to a corresponding split flap to selectively and independently open or close the respective split flap. Opening of the split flap to various angles increases downforce exerted on the rear suspension system for improved performance. A controller controls deployment and angular disposition of the split flaps, depending on driving conditions.

19 Claims, 6 Drawing Sheets

DYNAMICALLY ADJUSTABLE AIRFOIL SYSTEM FOR ROAD VEHICLES

CROSS-REFERENCE TO RELATED APPLICATION

This application claims the benefit of U.S. Provisional Patent Application Ser. No. 62/116,292, filed Feb. 13, 2015.

1. FIELD OF THE INVENTION

The present invention relates to motor vehicle performance enhancement systems, and particularly to a dynamically adjustable airfoil system for road vehicles that adjusts the aerodynamic profile of the road vehicle to selectively increase downforce on the vehicle in response to maneuvering conditions.

2. DESCRIPTION OF THE RELATED ART

High performance road vehicles have external body shapes that serve two general objectives. The first objective is to minimize running resistance by minimizing aerodynamic drag. The second objective is to maximize downforce by maximizing the downward vertical aerodynamic load component, especially at the wheels to insure that they remain on the surface as much as possible.

In order to increase the downforce, aerodynamic projecting elements are typically mounted onto the body of the motor vehicle. Among the most common aerodynamic projecting elements are rear spoilers, rear airfoils, and flaps that are arranged at the rear portion of the vehicle and serve the function of increasing the downforce, i.e., the downward vertical aerodynamic load. More complicated versions of these elements have the ability to be automatically adjusted to optimize and maximize the vehicle's performance. Most of these projecting elements apply downforce on the vehicle external body or on the vehicle's frame, which is then transmitted to the rear wheels through the suspension system. Such indirect transmission of downforce compromises the performance of the suspension system at high speeds, which reduces the vehicle maneuverability, cornering speed, and ride quality.

Therefore, it would be desirable to provide a system that transmits most of the downforce directly to the rear wheels with the ability of automatically adjusting its aerodynamic profile to maximize or minimize the vertical load on each wheel. Such a system would counterbalance the tendencies of a vehicle lift force, i.e., the upward vertical aerodynamic force, resulting from the vehicle's shape, which reduces the rear weight of the vehicle's body at high speed. This tendency reduces the overall weight of the vehicle, yet by implementing the system, the rear wheels would experience most of the downforce without compromising the performance of the suspension system. This system would make the road vehicle more agile and nimble at high speeds, in addition to improving rear braking performance, overall ride quality, and a possible reduction in fuel consumption.

Thus, a dynamically adjustable airfoil system for road vehicles solving the aforementioned problems is desired.

SUMMARY OF THE INVENTION

The dynamically adjustable airfoil system for road vehicles includes a pair of airfoils having their respective inner ends pivotally mounted to a central, vertical base on the rear of a road vehicle. An airfoil lift assembly is coupled to an outer end of each airfoil and to a rear wheel suspension system to facilitate dynamic adjustable positioning of the airfoils in response to movements of the suspension system. A split flap is pivotally mounted to each airfoil. A split flap actuator assembly is mounted inside each airfoil and is coupled to a corresponding split flap to selectively and independently open or close the respective split flap. Opening of the split flap to various angles increases downforce exerted on the rear suspension system for improved performance. A controller controls deployment and angular disposition of the split flaps, depending on driving conditions.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
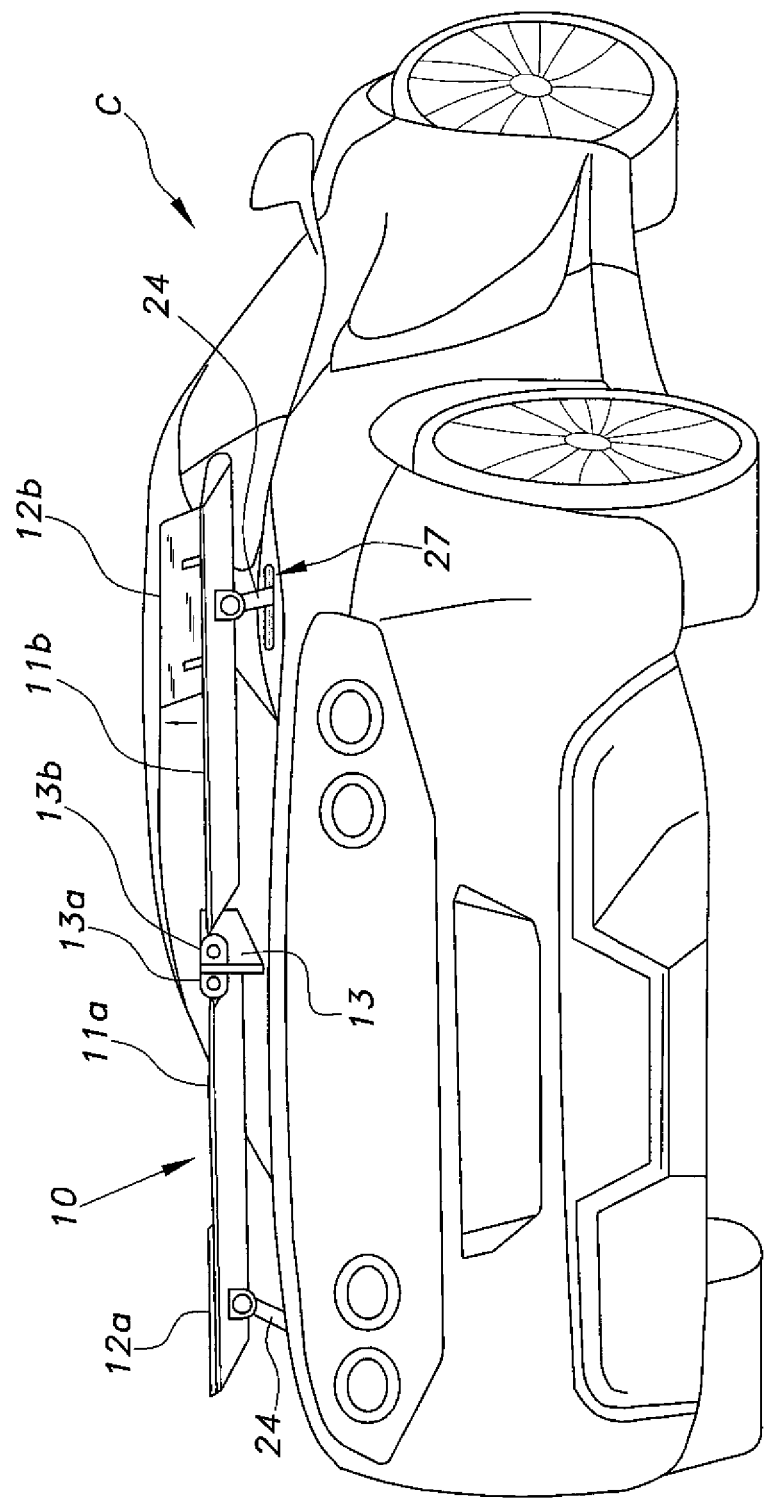
FIG. 1 is an environmental, perspective view of a dynamically adjustable airfoil system for road vehicles according to the present invention.

The dynamically adjustable airfoil system for road vehicles, generally referred to by the reference number 10 in the drawings, provides adjustable downforce to the rear suspension system RS of a road vehicle C to facilitate increased adherence to a road surface during movement and braking, and to improve overall performance and handling. The dynamically adjustable airfoil system 10 includes a pair of left and right airfoils or spoilers 11a, 11b pivotally mounted with respect to each other, and an airfoil lift assembly 20 coupled at one end to a conventional high-mounted, double wishbone suspension system RS mounted to the rear wheels RW of a road vehicle at one end and to the respective airfoil 11a, 11b at the opposite end. An example of the double wishbone suspension system RS can be found in U.S. Pat. No. 7,234,712, issued Jun. 26, 2007 to Yamazaki et al., which is hereby incorporated by reference in its entirety. The coupling of the airfoil lift assembly 20 permits the respective airfoil 11a, 11b to be independently raised or lowered in response to the generally vertical movements of the rear suspension system.

Figure 2:
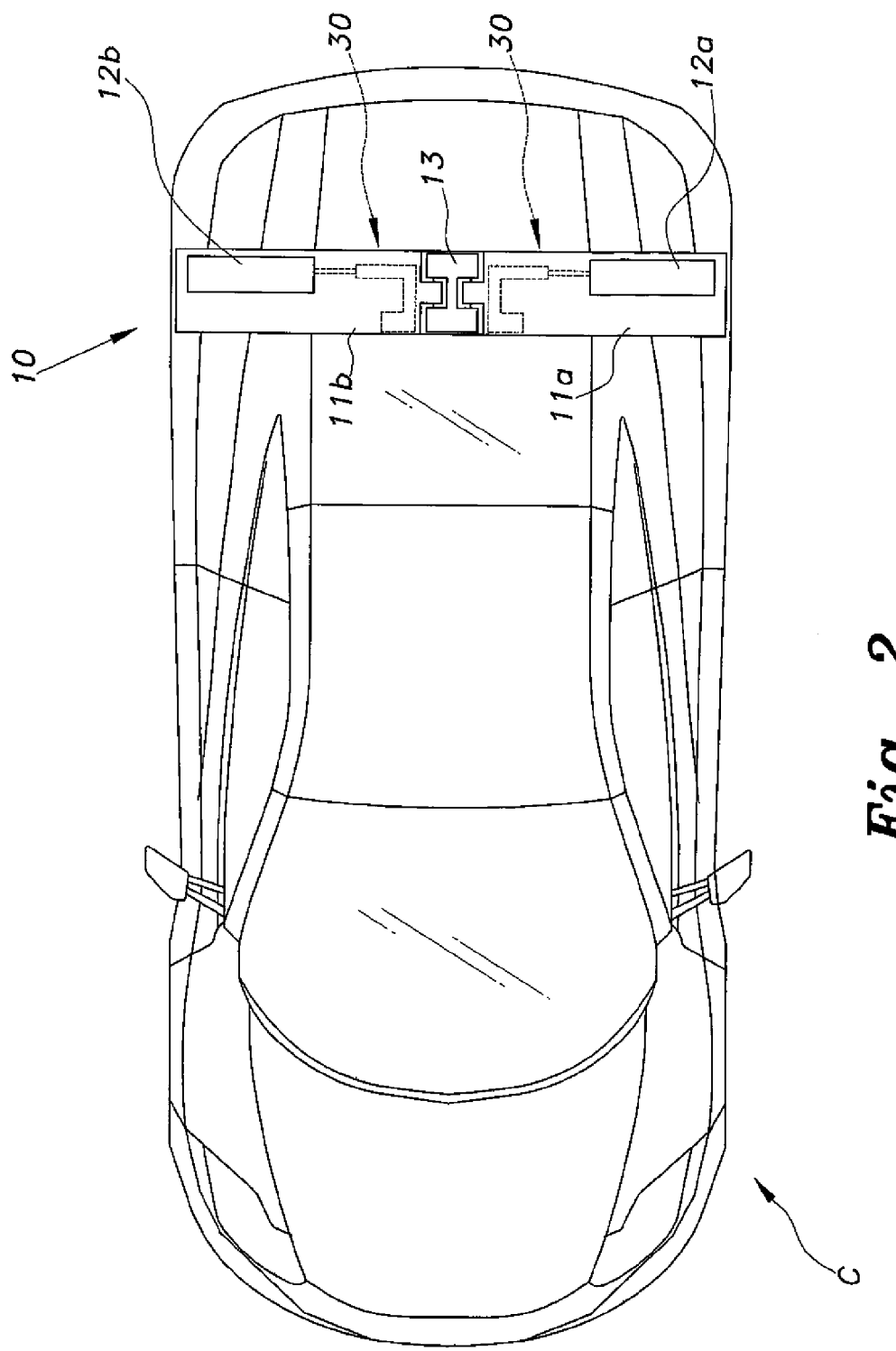
FIG. 2 is an environmental top view of the dynamically adjustable airfoil system of FIG. 1.
Figure 4A:
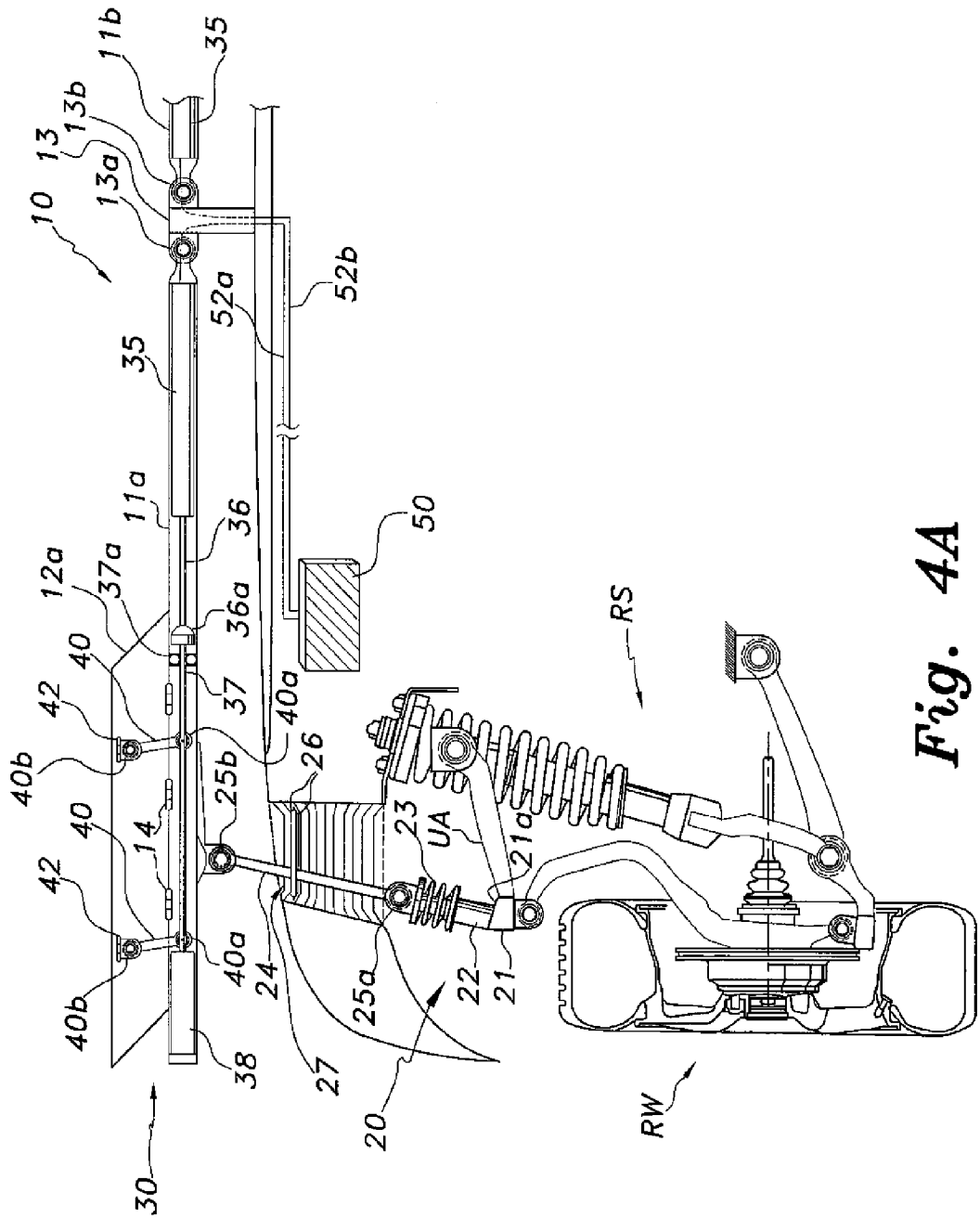
FIG. 4A is a detailed partial rear view in section of the dynamically adjustable airfoil system of FIG. 3, showing the left side of the system.
Figure 4B:
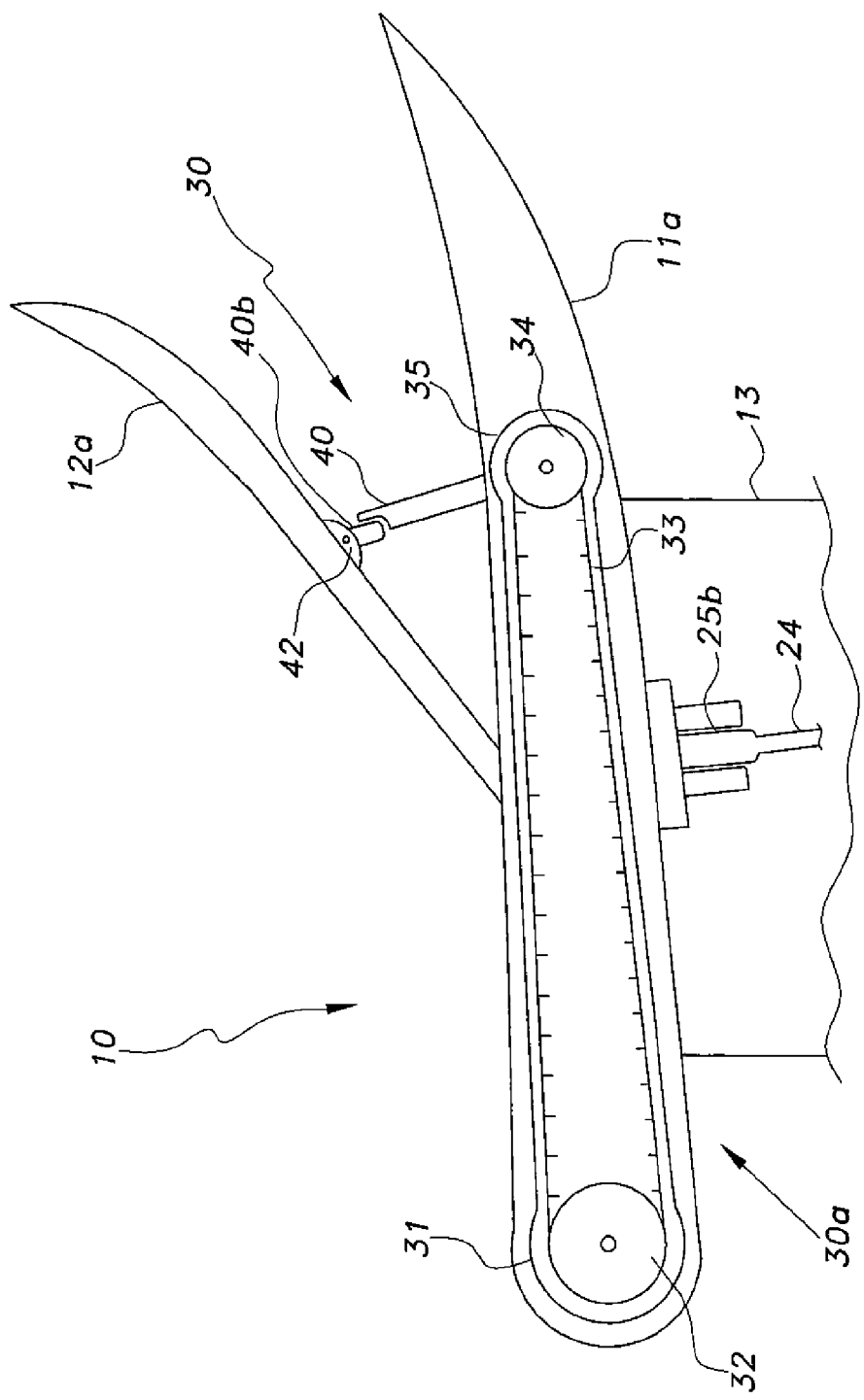
FIG. 4B is a diagrammatic side view of a linear actuator assembly for the left airfoil in a dynamically adjustable airfoil system for road vehicles according to the present invention.

As best seen in FIGS. 1, 2, and 4B, each airfoil 11a, 11b is preferably an elongate, generally flat wing configured to provide downforce from the air flowing over the airfoil 11a, 11b during movement of the vehicle C. A vertical base 13 extends from a center of a rear hatch of the vehicle C, and an inner end of each airfoil 11a, 11b is pivotally connected to the vertical base 13 at 13a and 13b, respectively. This pivotal connection 13a, 13b permits each airfoil 11a, 11b to pivot independently of the other in response to the movements of the rear suspension system.

The airfoil lift assembly 20 provides a direct connection between the airfoils 11a, 11b to the corresponding rear wheel RW and provides for pivoting movements of the airfoils 11a, 11b. Each airfoil 11a, 11b is coupled to a respective airfoil lift assembly 20 near the outer end of the respective airfoil 11a, 11b. The following description is directed toward the left airfoil lift assembly 20 for clarity and brevity. However, it is to be understood that the right airfoil lift assembly 20 is similarly configured unless indicated otherwise.

Figure 3:
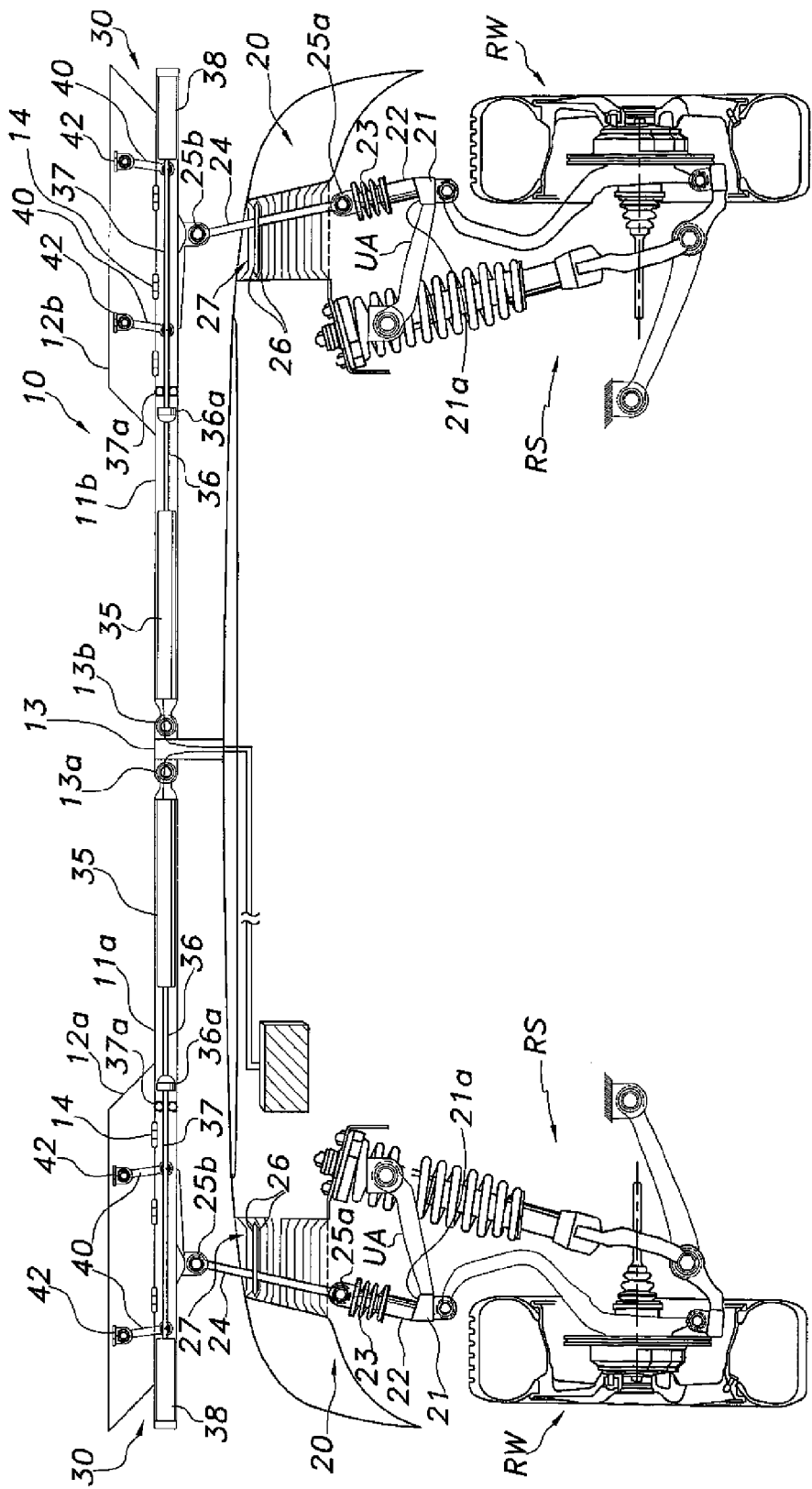
FIG. 3 is a rear view in section of the dynamically adjustable airfoil system of FIG. 1.
Figure 5:
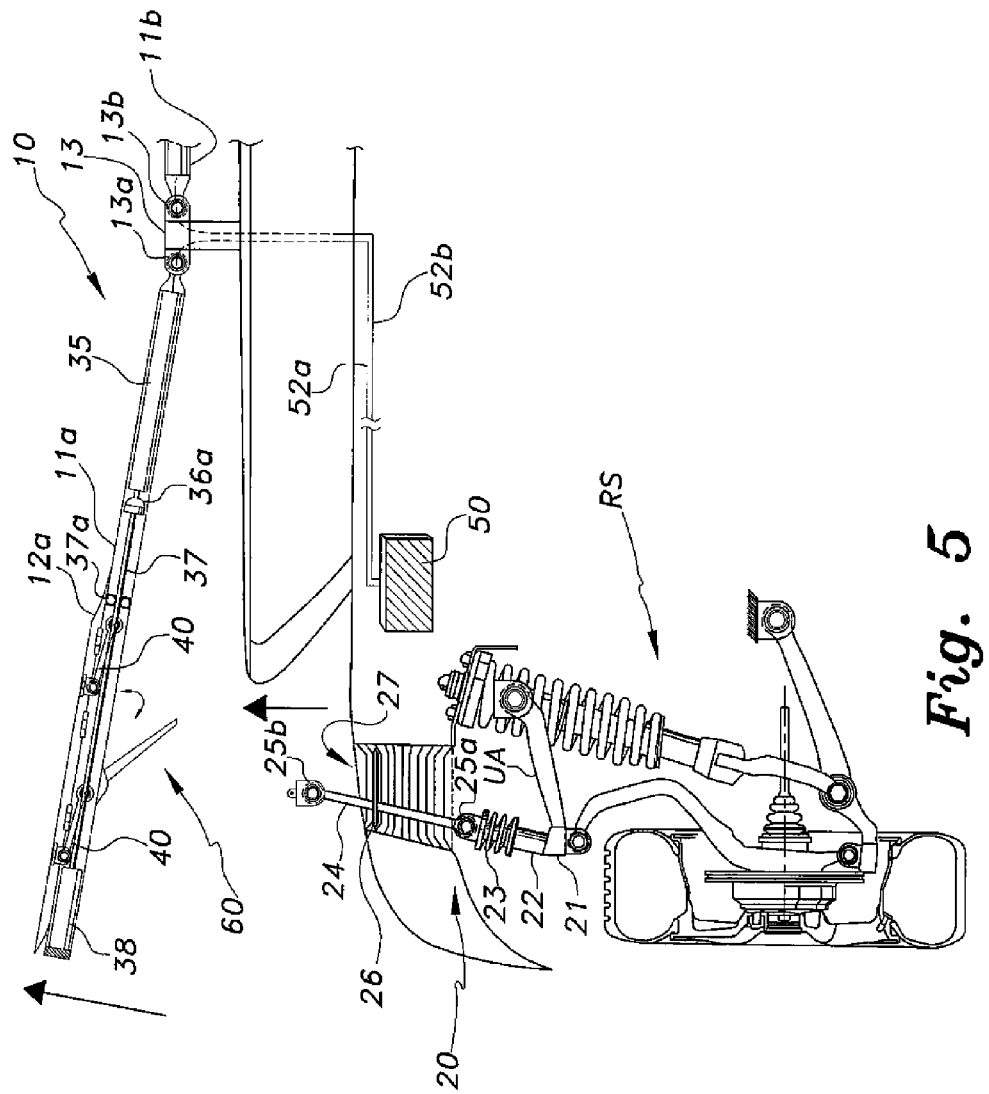
FIG. 5 is a partial rear view in section of a latching assembly for a dynamically adjustable airfoil system for road vehicles according to the present invention.

As best seen in FIGS. 3, 4A, and 5, the airfoil lift assembly 20 includes a slanted base 21 at one end of an upper arm UA of the rear suspension system RS. The slanted base 21 is provided with a generally beveled upper surface 21a in order to angle the connected components inward towards the vertical base 13. A damper 22 extends upward from the base 21, and an elongate airfoil lift tie rod 24 is pivotally connected to the damper 22 at a lower end of the airfoil lift tie rod 24. The upper end of the airfoil lift tie rod 24 is pivotally connected to a corresponding airfoil 11a, 11b.

The damper 22 is provided with a spring 23, and these two components serve to absorb shocks from the rear wheel RW and protect the respective airfoils 11a, 11b from potential damage as a result thereof. The damper 22 is preferably a hydraulic damper, although a pneumatic damper or the like can also be used.

Each airfoil lift tie rod 24 is configured to extend through a generally elongate rectangular opening or slot 27 in the body of the vehicle C. The slot 27 extends into the wheel housing and confines the movements of the airfoil lift tie rod 24. Each airfoil lift tie rod 24 includes a lower rubber bushing joint 25a and an upper rubber bushing joint 25b. The rubber bushing joints 25a, 25b protect the airfoils 11a, 11b from vibrations and accommodate lateral movements of the wheels RW during vehicular movement.

A pair of rotatable rubber stabilizers 26 is mounted inside the slot 27, and the airfoil lift tie rod 24 extends through the rubber stabilizers 26. The rubber stabilizers 26 enclose a corresponding airfoil lift tie rod 24, and they are preferably lubricated to permit rotation of the rubber stabilizers 26 with minimal interference. The enclosed nature of the airfoil lift tie rods 24 assists in constraining the movement of the tie rods 24 vertically and laterally within the slot 27. Moreover, the stabilizers 26 provide support to the outer ends of the respective airfoils 11a, 11b and buttress the airfoils 11a, 11b against the aerodynamic forces acting thereon.

Each airfoil 11a, 11b also includes a respective split flap 12a, 12b near the outer end of the airfoils 11a, 11b that can be selectively deployed, depending on the driving conditions. Each split flap 12a, 12b is a generally flat, rectangular wing section pivotally mounted on the corresponding airfoil 11a, 11b by one or more hinges 14. The split flaps 12a, 12b are deployable or pivotal between a normally closed position and an open position. The closed position is when the split flap 12a, 12b is substantially flush with the top surface of the airfoil 11a, 11b, providing the least wind resistant aerodynamic profile. The open position is when the split flap 12a, 12b is pivoted upward with respect to the corresponding airfoil 11a, 11b, thereby providing increased surface area and increased aerodynamic wind resistance. The extent of wind resistance increases as the split flap 12a, 12b pivots open towards the vertical at increasing angles. Wind resistance creates drag, and the downforce or vertical component is transmitted to the airfoil lift tie rod 24 and to the corresponding rear wheel RW to force the rear wheel RW towards the ground.

The split flaps 12a, 12b are generally smaller in dimension compared to the airfoils 11a, 11 b. The split flaps 12a, 12b are preferably constructed to be substantially flush with the top surface of the airfoil 11a, 11b. It is contemplated, however, that the split flaps 12a, 12b can also be constructed to extend above or below the top surface of the airfoils 11a, 11b. The corresponding results in drag will not significantly impact the overall performance of least drag and most drag between the closed and open positions of the split flaps 12a, 12b, respectively.

To selectively raise or lower the split flaps 12a, 12b, the dynamically adjustable airfoil system 10 includes a split flap actuator assembly 30 for each split flap 12a, 12b. As best seen in FIGS. 2, 3, 4A, and 4B, the split flap actuator assembly 30 includes a linear actuator assembly 30a (shown in FIG. 4B) mounted inside each respective airfoil 11a, 11b near the inner end and coupled to an elongate, rotary push rod 37 extending along the length of the airfoil 11a, 11b. A pair of spaced, split flap tie rods 40 is pivotally mounted to the push rod 37 at one end and pivotally mounted to the corresponding split flap 12a, 12b at the opposite end. The linear actuator assembly 30a selectively pushes and pulls the rotary push rod 37, causing the connected split flap 12a, 12b to rise and lower in response.

The linear actuator assembly 30a includes a relatively slim profile drive motor 31 and a drive gear 32 extending from the drive motor 31. A linear actuator 35 is operatively coupled to the drive motor 31 by a connected driven linear gear 34 and a drive belt 33 trained between the drive gear 32 and the driven linear gear 34. The diameter of the drive gear 32 is preferably larger than the driven linear gear 34 to impart more relative rotations to the driven linear gear 34. However, this gear ratio can be varied. An elongate, reciprocating actuator rod 36 extends from the linear actuator 35 and includes a bearing 36a at the distal end thereof. The bearing 36a is preferably a round bearing that secures and supports one end of the rotary push rod 37, while permitting free rotation of the push rod 37 thereon. The push rod 37 can also be provided with a fixed circular bearing 37a to provide additional support or reinforce support at that end. A linear bearing 38 is mounted inside the corresponding airfoil 11a, 11b near the outer end of the airfoil 11a, 11b. The linear bearing 38 supports the opposite end of the push rod 37 and permits the push rod 37 to reciprocate and rotate therein.

In use, rotation of the drive gear 32 rotates the driven linear gear 34 through their connection with the drive belt 33. Although rotary, the driven linear gear 34 converts the rotary motion into linear movement of the actuator rod 36, such as by a screw or threaded connection between the driven linear gear 34 and the actuator rod 36. As the actuator rod 36 extends or retracts by the linear actuator 35, the actuator rod 36 also pushes or pulls the push rod 37 through the connection to the bearing 36a.

The linear and rotary movements of the push rod 37 force the split flap tie rods 40 to move in response. Each split flap tie rod 40 includes a lower pivot joint 40a coupled to the push rod 37 and an upper pivot joint 40b coupled to the corresponding split flap 12a, 12b. Due to the compound motions of the split flap tie rods 40 during rising and lowering of the split flaps 12a, 12b, the upper pivot joint 40b is connected to a hinge 42 on the underside of the corresponding split flap 12a, 12b. This connection allows the split flap tie rod 40 to pivot about a horizontal axis, the axis being defined by the hinge 42. The interconnection between the hinges 42, the split flap tie rods 40, and the push rod 37 forms a four-bar linkage parallelogram where the hinges 40 and their connection to the split flap 12a, 12b and the push rod 37 define the upper and lower bars of the parallelogram while the split flap tie rods 40 form the parallel side bars of the parallelogram.

In use, the push and pull movements of the push rod 37 laterally translates the split flap tie rods 40. This causes the split flap tie rods 40 to pivot about the lower pivot joint 40a with respect to the push rod 37 in one direction, as well as about the upper pivot joint 40b with respect to the hinge 40 in the opposite direction. Since the dimensions of the parallelogram are fixed, except for the distance between back edge of the split flap 12a, 12b and the push rod 37, the push rod 37 also rotates to force the split flap tie rods 40 to pivot the hinge 42. It is noted that the rotation is not a full rotation within this configuration. Rather, the rotation is a relatively small arc. Thus, the upper and lower bars of the parallelogram are pushed apart to raise the split flap 12a, 12b and pulled to lower the split flap 12a, 12b. It can be seen from this description that the movements of the parallelogram are not confined to a single plane. The pivoting afforded by the hinges 40 and the push rod 37 also translates the plane of the parallelogram within the arc of rotation.

The operation of the split flaps 12a, 12b is controlled by a controller 50. The controller 50 includes lines 52a, 52b connected to the respective linear actuator assembly 30a in order to control deployment and angle of each split flap 12a, 12b independently and separately. The angle of rise for each split flap 12a, 12b can vary depending on various input parameters, such as acceleration, lateral gravitational force, steering position, throttle, speed, braking, and the like to improve the performance of the vehicle C. For example, the vehicle C shown in FIG. 1 is performing a right turn. At relatively high speeds, a hard right turn will induce lateral forces that tend to lift the right side of the vehicle C, thereby increasing the potential for the right wheels to lose contact with the road, especially on non-banked roads. To compensate, the right split flap 12b on the right airfoil 11b opens to a specific angle to increase the angle of attack, which creates additional downforce on the rear right wheel for better grip on corners, which improves cornering speed. Moreover, at hard braking, both split flaps 12a, 12b can be fully deployed to increase drag and exert maximum downforce on the rear wheels RW to counterbalance load transfer to the front of the vehicle and the front wheels, which improves vehicle braking performance. Additionally, the potential assistance from the split flaps 12a, 12b permits installation of larger rear brake rotors for increased braking performance. In normal conditions, the split flaps 12a, 12b are closed and the airfoils 11a, 11b can function like regular airfoils. Thus, the airfoils 11a, 11b dynamically adjust their relative positions in a passive manner in response to the movements of the rear suspension system, while the split flaps 12a, 12b dynamically adjust their deployment angle, depending on the driving conditions and the input parameters.

The controller 50 can also be programmed to optimize performance of various vehicles C. In other words, the selective deployment of each split flap 12a, 12b and the angle of deployment can be tailored to individual vehicles. For example, vehicles of various makes and models exhibit different performance characteristics with respect to each other due to many factors, such as body design and aerodynamics thereof, engine specifications, tire specifications, etc. One vehicle may have excellent performance in one area and nominal performance in another, while the performance characteristics of a different vehicle may be completely different. Whatever the performance parameters may be for a vehicle, the parameters can be analyzed, especially during development, and the operations of the controller 50 can be tailored to the specific vehicle to improve performance thereof.

The controller 50 can also be configured to provide manual deployment of the split flaps 12a, 12b. In some cases, a skilled driver may desire a more manual approach to attacking corners and braking, similar in concept to utilizing a hand brake during drifting.

Referring to FIG. 5, the dynamically adjustable airfoil system 10 also includes a latching mechanism 60 disposed on the underside of each airfoil 11a, 11b. The latching mechanism 60 permits detachable mounting of the airfoil lift tie rod 24 from the corresponding airfoil 11a, 11b in order to move the airfoil 11a, 11b out the way and gain access to the rear hatch of the vehicle C, e.g., for servicing and maintenance.

It is to be understood that the present invention is not limited to the embodiments described above, but encompasses any and all embodiments within the scope of the following claims.

I claim:

1. A dynamically adjustable airfoil system for road vehicles, comprising:
   a vertical base adapted for mounting to a rear of a vehicle;
   a pair of airfoils, each of the airfoils having an inner end pivotally mounted to the vertical base;
   an airfoil lift assembly connected to an outer end of each of the airfoils and adapted for connection to a rear suspension system of the vehicle, the airfoil lift assembly raising and lowering the corresponding airfoil in response to movements of the rear suspension system;
   wherein said airfoil lift assembly comprises:
   a slanted base adapted for mounting to a rear suspension system of a rear tire, the slanted base having a beveled upper surface;
   a damper extending upward from the beveled face;
   a spring coupled to the damper, the damper and the spring absorbing shocks from the rear tire during use; and
   an elongate airfoil lift tie rod pivotally connected to the damper at one end, the other end of the airfoil lift tie rod being pivotally connected to a corresponding one of said airfoils;
   a split flap pivotally mounted to each of the airfoils, the split flap being pivotal between a closed position and an open position;
   a split flap actuator assembly disposed inside each of the airfoils and coupled to the corresponding split flap, the split flap actuator assembly selectively opening and closing the corresponding split flap to increase and decrease downforce respectively; and
   a controller connected to each of the split flap actuator assemblies, the controller controlling deployment of each of the split flaps independently in response to driving conditions;
   wherein selective deployment of the split flaps increases downforce on rear wheels of the vehicle to increase maneuverability and performance.

2. The dynamically adjustable airfoil system according to claim 1, each said airfoil comprises an elongate, generally flat wing configured to provide downforce from air flowing over the wing during movement of the vehicle.

3. The dynamically adjustable airfoil system according to claim 1, further comprising at least one rubber stabilizer adapted for mounting inside an elongate slot on the rear of the vehicle adjacent a respective rear tire, each said airfoil lift tie rod extending through the at least one rubber stabilizer, the at least one rubber stabilizer constraining movement of said airfoil lift tie rod vertically and laterally within the elongate slot and buttressing a respective one of said airfoils against aerodynamic forces acting thereon.

4. The dynamically adjustable airfoil system according to claim 1, wherein each said elongate airfoil lift tie rod comprises an upper rubber bushing joint coupled to a respective one of the airfoils and a lower rubber bushing joint coupled to the damper of the corresponding airfoil lift assembly.

5. The dynamically adjustable airfoil system according to claim 1, further comprising a latching mechanism disposed on an underside of each said airfoil, the latching mechanism facilitating detachable mounting of the end of said airfoil lift tie rod opposite the end pivotally connected to said damper.

6. A dynamically adjustable airfoil system for road vehicles, comprising:
a vertical base adapted for mounting to a rear of a vehicle;
a pair of airfoils, each of the airfoils having an inner end pivotally mounted to the vertical base;
an airfoil lift assembly connected to an outer end of each of the airfoils and adapted for connection to a rear suspension system of the vehicle, the airfoil lift assembly raising and lowering the corresponding airfoil in response to movements of the rear suspension system;
a split flap pivotally mounted to each of the airfoils, the split flap being pivotal between a closed position and an open position;
a split flap actuator assembly disposed inside each of the airfoils and coupled to the corresponding split flap, the split flap actuator assembly selectively opening and closing the corresponding split flap to increase and decrease downforce respectively; and
a controller connected to each of the split flap actuator assemblies, the controller controlling deployment of each of the split flaps independently in response to driving conditions;
wherein selective deployment of the split flaps increases downforce on rear wheels of the vehicle to increase maneuverability and performance;
wherein each said split flap comprises a substantially flat wing section having an end and at least one hinge pivotally connecting a corresponding said airfoil and the end of the wing section.

7. The dynamically adjustable airfoil system according to claim 6, wherein each said split flap actuator assembly comprises:
a linear actuator assembly mounted inside the corresponding said airfoil; and
at least one split flap tie rod having a first end and an opposing second end, the first end being pivotally connected to the linear actuator assembly and the opposite second end being connected to the corresponding split flap.

8. The dynamically adjustable airfoil system according to claim 7, wherein said linear actuator assembly comprises:
a slim profile drive motor;
a drive gear extending from the drive motor;
a driven linear gear spaced from the drive gear;
a drive belt trained around the drive gear and the driven gear;
a linear actuator operatively coupled to the driven linear gear, the linear actuator linearly extending and retracting in response to operation of the driven linear gear, the linear actuator having a distal end and a bearing at the distal end;
an elongate actuator rod having first and second ends, the first end of the actuator rod being coupled to the bearing, the actuator rod freely rotating with respect to the linear actuator, the first end of the split flap tie rod being pivotally mounted on the actuator rod, the actuator rod reciprocating in response to linear movements of the linear actuator; and
a linear bearing mounted inside the corresponding airfoil and spaced from the linear actuator, the linear bearing receiving and supporting the second end of the actuator rod during reciprocating movements of the actuator rod.

9. The dynamically adjustable airfoil system according to claim 8, further comprising a circular bearing rigidly mounted inside said corresponding airfoil, the circular bearing being disposed between said linear actuator and said actuator rod to slidably receive said actuator rod and provide additional support thereof.

10. The dynamically adjustable airfoil system according to claim 7, further comprising at least one hinge connected to each said split flap, the second end of said at least one split flap tie rod being pivotally mounted to the at least one hinge of said split flap, said at least one split flap tie rod pivoting with respect to said at least one hinge during reciprocating movements of said actuator rod, thereby forcing pivotal movements of said at least one hinge with respect to said corresponding split flap to selectively raise or lower said corresponding split flap between the open and closed positions.

11. A dynamically adjustable airfoil system for road vehicles, comprising:
a base adapted for mounting to a rear of a vehicle;
a pair of airfoils, each of the airfoils having an inner end pivotally mounted to the base and an outer end;
an airfoil lift assembly coupled to the outer end of each of the airfoils and adapted for connection to a rear suspension system of the vehicle, the airfoil lift assembly raising and lowering the corresponding airfoil in response to movements of the rear suspension system;
at least one hinge mounted to each of the airfoils at one of the ends of the airfoil;
a split flap pivotally mounted to the at least one hinge on a corresponding one of the airfoils, the split flap being pivotal between a closed position and an open position; and
a split flap actuator assembly disposed inside each of the airfoils and connected to the corresponding split flap, the split flap actuator assembly selectively opening and closing the corresponding split flap to increase and decrease downforce, respectively;
wherein selective deployment of the split flaps increases downforce on the rear of the vehicle to increase maneuverability and performance.

12. The dynamically adjustable airfoil system according to claim 11, further comprising a controller connected to each of the split flap actuator assemblies, the controller controlling deployment of each of the split flaps independently in response to driving conditions.

13. The dynamically adjustable airfoil system according to claim 11, wherein said airfoil lift assembly comprises:
a slanted base adapted for mounting to a rear suspension system of a rear tire of the vehicle, the slanted base having a beveled upper surface;
a damper extending upward from the beveled face;
a spring attached to the damper, the damper and the spring absorbing shocks from the rear tire during use; and
an elongate airfoil lift tie rod having a first end and a second end, the first end being pivotally connected to the damper, the second end being pivotally connected to the corresponding airfoil.

14. The dynamically adjustable airfoil system according to claim 13, further comprising at least one rubber stabilizer adapted for mounting inside an elongate slot on the rear of the vehicle adjacent a respective rear tire, each said airfoil lift tie rod extending through the at least one rubber stabilizer, the at least one rubber stabilizer constraining movement of said airfoil lift tie rod vertically and laterally within the elongate slot and buttressing the corresponding airfoil against aerodynamic forces acting thereon.

15. The dynamically adjustable airfoil system according to claim 13, further comprising a latching mechanism disposed on each said airfoil, the latching mechanism facilitating detachable mounting of the second end of said airfoil lift tie rod.

16. The dynamically adjustable airfoil system according to claim 11, further comprising at least one hinge connected to a corresponding one of said airfoils and one of the ends of said split flap, the at least one hinge facilitating pivoting movements of said split flap with respect to the corresponding one of said airfoils.

17. The dynamically adjustable airfoil system according to claim 16, wherein each said split flap actuator assembly comprises:
   a linear actuator assembly mounted inside the corresponding one of said airfoils;
   at least one split flap tie rod having a first end and a second end, the first end being pivotally connected to the linear actuator assembly, the second end being connected to the corresponding split flap.

18. The dynamically adjustable airfoil system according to claim 17, wherein said linear actuator assembly comprises:
   a slim profile drive motor;
   a drive gear extending from the drive motor;
   a driven linear gear spaced from the drive gear;
   a drive belt trained around the drive gear and the driven gear;
   a linear actuator operatively coupled to the driven linear gear, the linear actuator linearly extending and retracting in response to operation of the driven linear gear, the linear actuator having a distal end and a bearing at the distal end;
   an elongate actuator rod having first and second ends, the first end of the actuator rod being coupled to the bearing, the actuator rod freely rotating with respect to the linear actuator, the first end of the split flap tie rod being pivotally mounted on the actuator rod, the actuator rod reciprocating in response to linear movements of the linear actuator; and
   a linear bearing mounted inside the corresponding airfoil and spaced from the linear actuator, the linear bearing receiving and supporting the second end of the actuator rod during reciprocating movements of the actuator rod.

19. The dynamically adjustable airfoil system according to claim 18, further comprising at least one hinge connected to each said split flap, the second end of said at least one split flap tie rod being pivotally mounted to the at least one hinge of said split flap, said at least one split flap tie rod pivoting with respect to said at least one hinge during reciprocating movements of said actuator rod, thereby forcing pivotal movements of said at least one hinge with respect to said corresponding split flap to selectively raise or lower said corresponding split flap between the open and closed positions.

* * * * *